United States Patent [19]

Nagata et al.

[11] Patent Number: 5,424,363
[45] Date of Patent: Jun. 13, 1995

[54] POLYVINYL CHLORIDE-BASED RESIN COMPOSITION

[75] Inventors: Satoshi Nagata; Osamu Sodeyama, both of Ibaraki, Japan

[73] Assignee: Shin-Etsu Chemical Co., Ltd., Tokyo, Japan

[21] Appl. No.: 345,410

[22] Filed: Nov. 21, 1994

[30] Foreign Application Priority Data

Nov. 22, 1993 [JP] Japan .................................. 5-291681

[51] Int. Cl.$^6$ ............................................. C08L 27/06
[52] U.S. Cl. ...................................... 525/85; 525/222; 525/239
[58] Field of Search ................................. 525/85, 222

[56] References Cited

U.S. PATENT DOCUMENTS 4,464,495 8/1984 Brown .................................. 524/100
5,250,616 10/1993 Asay ...................................... 525/85

FOREIGN PATENT DOCUMENTS 211794 7/1984 German Dem. Rep. ............ 525/222

*Primary Examiner*—David Buttner
*Attorney, Agent, or Firm*—Millen, White, Zelano & Branigan

[57] ABSTRACT

Proposed is a polyvinyl chloride-based resin composition exhibiting excellent moldability with high flowability in molding and capable of giving molded articles having excellent mechanical properties including tensile strength and impact strength as well as heat resistance along with high resistance against yellowing by weathering. The resin composition comprises (a) a homopolymeric polyvinyl chloride resin having an average degree of polymerization of 700 to 2500, (b) an acrylic rubber-based graft copolymer, (c) an ethylene-vinyl acetate copolymeric resin of a specific copolymerization ratio and (d) an acrylonitrile-styrene copolymeric resin of a specific copolymerization ratio each in a specified weight proportion.

11 Claims, No Drawings

POLYVINYL CHLORIDE-BASED RESIN COMPOSITION

BACKGROUND OF THE INVENTION

The present invention relates to a polyvinyl chloride-based resin composition or, more particularly, to a resin composition based on a polyvinyl chloride resin exhibiting excellent moldability with good flowability in the molding process and still capable of giving molded articles having excellent impact strength, tensile strength, heat resistance, weatherability and smoothness of surface.

As is well known, molded articles of a resin composition based on a polyvinyl chloride resin, referred to as PVC resin hereinafter, are imparted with increased properties such as tensile strength, heat resistance and the like as the average degree of polymerization of the PVC resin as the base ingredient of the resin composition is increased, in particular, in an unplasticized resin composition for rigid molded articles, of which the impact strength can be greatly improved even by compounding with a small amount of an impact-strength improver.

It is also known that a resin composition based on a PVC resin of a high degree of polymerization is disadvantageous in relation to the moldability. Namely, the flowability behavior of such a resin composition is necessarily poor while high flowability of the resin composition in molding is essential in any molding procedures including calendering, extrusion molding, injection molding, blow molding, vacuum forming and the like, especially when high-speed molding is undertaken so that the productivity of the molding process is greatly decreased and the molded articles have poor quality in respect of the low smoothness of the surface. A countermeasure for these problems accompanying the use of a high molecular weight PVC resin is to increase the molding temperature. However, extent of increase in the molding temperature is limited because the PVC resin per se is subject to thermal degradation. Therefore, the excellent properties inherent in PVC resins cannot be fully exhibited in the articles molded at such a high temperature when the average degree of polymerization of the PVC resin is so high that sufficiently good flowability of the resin composition without formulation of a plasticizer can be obtained only by increasing the temperature to such a level as to unavoidably cause thermal degradation of the PVC resin.

The problem of low flowability of the PVC-based resin composition is of course not involved in the molding process when the average degree of polymerization of the PVC resin is sufficiently low. However, the articles molded from such a resin composition are poor in impact strength which can be improved only by compounding the resin composition with an unduly increased amount of an impact strength improver such as a polybutadiene-based rubber resulting in a decrease in the heat resistance, tensile strength and other properties of the molded articles. It is also way possible way to improve the moldability of a PVC-based resin composition by compounding the composition with a processing aid or a lubricant though with disadvantages and problems on its part.

Accordingly, it is proposed to undertake the above mentioned various measures in combination so as to improve the moldability of the PVC-based resin composition. In particular, compounding of the resin composition with a polybutadiene-based rubber is effective for the improvement of the impact strength of the molded articles even with a relatively small amount of addition while admixture of a polybutadiene-based rubber causes another problem that the molded article of such a resin composition is subject to discoloration or a decrease in the impact strength and tensile strength after lapse of time because polybutadiene-based rubbers are susceptible to degradation by oxidation under the influences of heat and light.

On the other hand, Japanese Patent Kokai No. 50-88170 discloses a PVC-based resin composition comprising from 90 to 99 parts by weight of a PVC-based graft copolymer and from 1 to 10 parts by weight of a copolymeric resin of methyl methacrylate and/or acrylonitrile, styrene and an alkyl ester of acrylic acid, copolymeric resin of acrylonitrile, butadiene and styrene, referred to as an ABS resin hereinafter, or chlorinated polyethylene either alone or in combination. Although improvements can be obtained in the impact strength of the articles molded from such a resin composition, no improvement can be obtained in the flowability behavior of the resin composition so that the resin composition is unsatisfactory with respect to the moldability and smoothness of the surface of the molded articles. Similar disclosures are given in Japanese Patent Publication No. 48-57846 and Japanese Patent Kokai No. 60-179443.

SUMMARY OF THE INVENTION

The present invention accordingly has an object to provide a novel and improved PVC resin-based composition exhibiting good flowability in molding and capable of giving molded articles having excellent impact strength, tensile strength, heat resistance and weatherability as well as high smoothness of the surface with good productivity of the molding process.

Thus, the polyvinyl chloride-based resin composition of the present invention comprises, as a uniform blend:

(a) 100 parts by weight of a polyvinyl chloride resin having an average degree of polymerization in the range from 700 to 2500;

(b) from 4 to 15 parts by weight of an acrylic rubber-based graft copolymer;

(c) from 0.5 to 8 parts by weight of a copolymeric resin of ethylene and vinyl acetate, referred to as an EVA resin hereinafter, of which the weight ratio of the ethylene moiety to the vinyl acetate moiety is in the range from 40:60 to 70:30; and (d) from 1 to 10 parts by weight of a copolymeric resin of acrylonitrile and styrene, referred to as an AS resin hereinafter, of which the weight ratio of the acrylonitrile moiety to the styrene moiety is in the range from 10:90 to 35:65.

In particular, the acrylic rubber-based graft copolymer as the component (b) preferably consists of from 50 to 80% by weight of the acrylic rubber as the base polymer and from 50 to 20% by weight of the grafting moiety formed by the graft copolymerization of a monomeric compound selected from the group consisting of alkyl esters of acrylic or methacrylic acid of which the alkyl group has 2 to 8 carbon atoms, aromatic vinyl compounds and unsaturated nitrile compounds.

DETAILED DESCRIPTION OF THE PREFERRED EMBODIMENTS

As is described above, the inventive PVC-based resin composition, which has been established as a result of the extensive investigations to obtain compatible improvements in respects of, on one hand, the workability of the resin composition with excellent flowability in molding and high surface smoothness of the molded articles, and, on the other hand, properties of the molded articles in respects of, in particular, the impact strength and tensile strength, comprises a specific PVC resin as the base ingredient, i.e. component (a), admixed with three types of polymeric materials as the components (b), (c) and (d). Namely, the acrylic rubber-based graft copolymer as the component (b) serves to improve the impact strength of the molded articles and the EVA resin as the component (c) serves to improve the flowability behavior of the resin composition along with an increase in the surface smoothness of the molded articles while the AS resin as the component (d) has an effect to increase the tensile strength of the molded articles. Each of these three kinds of additive polymers has no unsaturated linkages in the main chains of the molecular structure so that the polymer is not susceptible to the scission of the molecular chains by oxidation or heating so that the resin composition or the molded article thereof can be imparted with improved stability not to cause degradation or discoloration by heating in the course of molding or after use for a prolonged time even without compounding of the resin composition with a large amount of an ultraviolet absorber and/or antioxidant.

The component (a) as the base ingredient in the inventive resin composition is a PVC resin having an average degree of polymerization in the range from 700 to 2500 or, preferably, from 1000 to 1700. When the degree of polymerization of the PVC resin is too small, the molded articles of the resin composition would be inferior in the impact strength and heat resistance while, when the degree of polymerization of the PVC resin is too large, the moldability of the resin composition would be poor unless the temperature of the molten resin is increased so much in the molding works. The PVC resin as the component (a) is not limited to a homopolymer of vinyl chloride but can be a copolymer mainly composed of vinyl chloride copolymerized with other comonomers copolymerizable therewith provided that the weight fraction of the vinyl chloride moiety is at least 50%. Chlorinated polyvinyl chloride resins can also be used as the component (a). Homopolymeric PVC resins are preferred.

The above mentioned comonomers copolymerizable with vinyl chloride include $\alpha$-olefins such as ethylene and propylene, acrylic acid and alkyl esters thereof such as methyl acrylate and ethyl acrylate, methacrylic acid and alkyl esters thereof such as methyl methacrylate, maleic acid and esters thereof, vinyl esters such as vinyl acetate and vinyl propionate, vinyl ethers such as vinyl lauryl ether and vinyl isobutyl ether, maleic anhydride, acrylonitrile, styrene, vinylidene chloride, maleimide and the like though not particularly limitative thereto. These comohomers can be used either singly or as a combination of two kinds or more according to need.

The component (b) in the inventive resin composition is an acrylic rubber-based graft copolymer consisting of an acrylic rubber as the base polymer and grafting monomer thereon selected from the group consisting of alkyl esters of acrylic or methacrylic acid of which the alkyl group has 2 to 8 carbon atoms, aromatic vinyl compounds and unsaturated nitrile compounds. These grafting monomers can be used either singly or as a combination of two kinds or more according to need. The weight ratio of the base polymer to the grafting moiety formed from these grafting monomers is in the range from 50:50 to 80:20. When the weight fraction of the rubbery base polymer is too small, the impact strength of the molded articles cannot be fully improved while, when the weight fraction of the base polymer is too large, the molded articles of the resin composition would have a decreased tensile strength along with a decrease in the softening point of the resin composition. Various grades of commercial products to meet the above described requirements are available on the market and can be used as such as the component (b) in the inventive resin composition. Examples of such commercial products include KM 334 produced by Rohm & Haas Co., Durastrength 200 produced by ATO Chemical Co., S 2001 produced by Mitsubishi Rayon Co. and HIA 28 produced by Kureha Chemical Co.

The amount of the component (b) in the inventive resin composition is in the range from 4 to 15 parts by weight or, preferably, from 5 to 13 parts by weight per 100 parts by weight of the PVC resin as the component (a). When the amount thereof is too small, the improving effect on the impact strength of the molded article cannot be as high as desired while, when the amount thereof is too large, certain adverse influences are caused on the properties of the molded articles such as heat resistance, tensile strength and the like as well as on the workability of the resin composition.

The acrylic rubber used as the base polymer in the preparation of the graft copolymer as the component (b) is a polymer of an alkyl ester of acrylic acid of which the alkyl group has up to 13 carbon atoms or a copolymer of the same acrylic monomer with an unsaturated nitrile monomer. The above mentioned alkyl ester of acrylic acid is exemplified by n-butyl acrylate, ethyl acrylate, propyl acrylate, hexyl acrylate, 2-ethylhexyl acrylate and the like. These acrylic monomers can be used either singly or as a combination of two kinds or more according to need.

The monomeric compounds for grafting to the acrylic rubber as the base polymer are selected from the group consisting of alkyl esters of acrylic acid of which the alkyl group has 2 to 8 carbon atoms such as ethyl acrylate, propyl acrylate and 2-ethylhexyl acrylate, alkyl esters of methacrylic acid of which the alkyl group has 2 to 8 carbon atoms such as ethyl methacrylate, propyl methacrylate and 2-ethylhexyl methacrylate, aromatic vinyl compounds such as styrene, $\alpha$-methyl styrene, vinyl toluene and $\alpha$-methyl vinyl toluene and unsaturated nitrile compounds such as acrylonitrile and methacrylonitrile. These grafting monomers can be used either singly or as a combination of two kinds or more according to need.

The EVA resin as the component (c) in the inventive resin composition is a copolymer of ethylene and vinyl acetate of which the weight proportion of the ethylene moiety to the vinyl acetate moiety is in the range from 40:60 to 70:30. When an EVA resin of which the weight fraction of the vinyl acetate moiety is too small is used as the component (c), the impact strength and the tensile strength of the molded articles are decreased while, when the weight fraction of the vinyl acetate moiety is too large, a decrease is caused in the heat resistance of the molded articles.

The amount of the EVA resin as the component (c) in the inventive resin composition is in the range from 0.5 to 8 parts by weight or, preferably, from 1 to 7 parts by weight per 100 parts by weight of the PVC resin as the component (a). When an appropriate amount of the EVA resin is compounded in the inventive resin composition, the EVA resin is distributed in the blend in such a fashion as to surround the flowing units of the PVC resin having a diameter of about 1 to 2 $\mu$m greatly contributing to the improvement of the flowability of the resin composition and surface smoothness of the molded articles. When the amount of the EVA resin is too small, the above mentioned improvement cannot be fully obtained and the moldability of the resin composition is decreased while, when the amount of the EVA resin is too large, the molded articles of the resin composition would have somewhat decreased properties such as heat resistance, tensile strength and the like.

The AS resin as the component (d) in the inventive resin composition is a copolymer of acrylonitrile and styrene, of which the weight proportion of the acrylonitrile moiety to the styrene moiety is in the range from 10:90 to 35:65 or, preferably, from 28:80 to 25:75. When the weight fraction of the acrylonitrile moiety is too small, the AS resin has poor compatibility with the PVC resin eventually causing phase separation in the resin composition while, when the weight fraction of the acrylonitrile moiety is too large, on the other hand, the resin composition compounded with such an AS resin would have decreased flowability in molding.

The amount of the AS resin as the component (d) in the inventive resin composition is in the range from 1 to 10 parts by weight or, preferably, from 3 to 10 parts by weight per 100 parts by weight of the PVC resin as the component (a). When the amount of the AS resin is too small, no sufficient improvement can be obtained in the tensile strength of the molded articles of the resin composition while, when the amount of the AS resin is too large, a decrease is caused in the impact strength of the molded articles along with a decrease in the moldability of the resin composition.

The PVC-based resin composition of the invention can be obtained basically by uniformly blending the above described essential components (a), (b), (c) and (d) each in a specified amount. It is of course optional that the inventive resin composition is further admixed with various kinds of known additives including stabilizers, stabilizing aids, lubricants, inorganic fillers, plasticizers, coloring agents, ultraviolet absorbers, antioxidants and the like each in a limited amount. The above mentioned stabilizer is not particularly limitative and can be selected from those conventionally used in PVC-based resin compositions including organic tin compounds such as laurate, maleate and mercaptide of tin and metal soaps of calcium, barium, lead and the like either singly or as a combination of two kinds or more according to need. The above mentioned stabilizing aid is typically an epoxy compound but ultraviolet absorbers and antioxidants also serve as a stabilizing aid. The above mentioned lubricant is exemplified by hydrocarbon compounds such as paraffin waxes and polyethylene waxes, higher fatty acids such as palmitic acid and stearic acid, higher aliphatic alcohols such as stearyl alcohol, esters of a fatty acid and a higher alcohol and partial esters of a fatty acid and a polyhydric alcohol. The inorganic filler is preferably a calcium carbonate powder which can be heavy, i.e. pulverized, calcium carbonate or light, i.e. precipitated, calcium carbonate. The impact strength of molded articles can be remarkably improved by the admixture of the resin composition with a large amount of light calcium carbonate filler.

The PVC-based resin composition of the invention is prepared by uniformly blending the above described essential and optional components by using a conventional resin-processing machine such as high-speed mixers and the like and shaped into granules or pellets suitable for molding of articles by a conventional molding process such as calendering, extrusion molding, injection molding, blow molding and the like into desired molded articles.

In the following, the PVC-based resin composition of the invention is illustrated in more detail by way of examples and comparative examples although the scope of the invention is never limited to these examples. In the following description, the term of "parts" always refers to "parts by weight".

EXAMPLE 1

A PVC-based resin composition, referred to as the composition I hereinafter, was prepared by blending: 100 parts of a homopolymeric PVC resin having an average degree of polymerization of 700 (TK 700, a product by Shin-Etsu Chemical Co.), referred to as the PVC-I hereinafter; 7 parts of an acrylic rubber-based graft copolymer prepared by the graft copolymerization of 40 parts of methyl methacrylate onto 60 parts of an acrylic rubber which was a copolymer of butyl acrylate and 1,3-butylene dimethacrylate in a weight ratio of 93:7; 3 parts of an EVA resin of which the weight proportion of the ethylene moiety to the vinyl acetate moiety was 59:41, referred to as the EVA-I hereinafter; 7 parts of an AS resin, of which the weight proportion of the acrylonitrile moiety to the styrene moiety was 23:77 (Cevian FD,, a product by Daicel Chemical Co.); 1 part of an organic tin-based stabilizer (T-17MJ, a product by Katsuta Kako Co.); 0.7 part of calcium stearate as a stabilizing aid; 6 parts of calcium carbonate filler (Hakuenka CCR, a product by Shiraishi Calcium Co.); and 0.5 part of polyethylene wax lubricant (AC-6A, a product by Allied Chemical CO.), and kneading the blend on a 6-inch testing roller mill at 170° C. for 5 minutes.

The thus prepared resin composition was subjected to tests of the flowability in extrusion and smoothness of the surface of the extruded body and, further, the resin composition was shaped into sheets of 0.8 mm thickness, which were subjected to tests for the tensile strength, impact strength and heat resistance according to the testing procedures described below to give the results shown in Table 1.

Testing procedure of flowability:

Measurement was performed by using a Koka-type Flow Tester (manufactured by Shimadzu Seisakusho) to determine the rate of extrusion in ml/second through an orifice of 1.0 mm diameter under a load of 100 kg at 200° C.

Testing procedure of surface smoothness:

The surface of the string-like body obtained by extrusion in the flowability test was visually examined to record the surface condition in five ratings of 1 to 5 according to the criteria given below.

1: visible roughness without luster on the entire surface
2: roughness, though not visible, without luster on the entire surface
3: roughness without luster on a part of the surface
4: smoothness with luster on most of the surface
5: smoothness with luster on the entire surface Testing procedure of impact strength:

Four of the above prepared 0.8 mm thick sheets of the resin composition were laid one on the other and the stack was, after preheating for 6 minutes at 180° C., pressed together for 4 minutes at 180° C. into an integral sheet of 3 mm thickness, which was subjected to the measurement of the impact strength according to the procedure specified in JIS K 7110.

Testing procedure of tensile strength:

Four of the above prepared 0.8 mm thick sheets of the resin composition were laid one on the other and the stack was, after preheating for 5 minutes at 180° C., pressed together for 3 minutes at 180° C. into an integral sheet of 3 mm thickness, which was subjected to the measurement of the tensile strength according to the procedure specified in JIS K 7113.

Testing procedure of heat resistance:

The same sheet of 3 mm thickness prepared for the measurement of the impact strength was subjected to the measurement of the heat resistance according to the procedure specified in JIS K 7200.

EXAMPLE 2

The formulation of the PVC-based resin composition and the testing procedures thereof were substantially the same as in Example 1 with the exception that the PVC-I resin was replaced with the same amount of another PVC resin having an average degree of polymerization of 1000 (TK 1000, a product by Shin-Etsu Chemical Co.), referred to as the PVC-II hereinafter. In addition to the same evaluation tests undertaken in Example 1 to give the results shown in Table 1, the thus prepared resin composition was further subjected to the test for yellowing by the testing procedure described below to give the result shown in Table 2.

Testing procedure of yellowing:

The 0.8 mm thick resin sheets were subjected to accelerated aging by keeping in a weathering accelerator (Sunshine Weather-O-Meter, Model WEL-SUN-HC, manufactured by Suga Testing Machine Co.) for 100, 300, 500 or 1000 hours and the color difference ΔE of the resin sheets was determined according to the procedure specified in JIS Z 8730 by using a color difference meter (Model Z-1001DP, manufactured by Nippon Denshoku Kogyo Co.). A larger value of ΔE means a higher degree of yellowness.

EXAMPLE 3

The formulation of the PVC-based resin composition and the testing procedures thereof were substantially the same as in Example I excepting replacement of the PVC-I resin with the same amount of a third PVC resin having an average degree of polymerization of 1700 (TK 1700, a product by Shin-Etsu Chemical Co.), referred to as the PVC-III hereinafter. The results of testing are shown in Table 1.

COMPARATIVE EXAMPLE 1

The formulation of the PVC-based resin composition and the testing procedures thereof were substantially the same as in Example 1 excepting replacement of the PVC-I resin with the same amount of a fourth PVC resin having an average degree of polymerization of 3000 (TK 2500P, a product by Shin-Etsu Chemical Co.), referred to as the PVC-IV hereinafter. The results of testing are shown in Table 1.

COMPARATIVE EXAMPLE 2

The formulation of the PVC-based resin composition and the testing procedures thereof were substantially the same as in Example 1 excepting replacement of the PVC-I resin with the same amount of a fifth PVC resin having an average degree of polymerization of 600 (TK 600, a product by Shin-Etsu Chemical Co.), referred to as the PVC-V hereinafter. The results of testing are shown in Table 1.

COMPARATIVE EXAMPLE 3

The formulation of the PVC-based resin composition and the testing procedures thereof other than the yellowing test were substantially the same as in Example 2 excepting replacement of the EVA-I resin with the same amount of another EVA resin, of which the weight proportion of the ethylene moiety to the vinyl acetate moiety was 80:20, referred to as the EVA-II hereinafter. The results of testing are shown in Table 1.

COMPARATIVE EXAMPLE 4

The formulation of the PVC-based resin composition and the testing procedures thereof other than the yellowing test were substantially the same as in Example 2 excepting replacement of the EVA-I resin with the same amount of a third EVA resin, of which the weight proportion of the ethylene moiety to the vinyl acetate moiety was 28:80, referred to as the EVA-III hereinafter. The results of testing are shown in Table 1.

COMPARATIVE EXAMPLE 5

The formulation of the PVC-based resin composition and the testing procedures thereof other than the yellowing test were substantially the same as in Example 2 excepting decrease in the amount of the acrylic rubber-based graft copolymer from 7 parts to 2 parts. The results of testing are shown in Table 1.

COMPARATIVE EXAMPLE 6

The formulation of the PVC-based resin composition and the testing procedures thereof other than the yellowing test were substantially the same as in Example 2 excepting increase in the amount of the acrylic rubber-based graft copolymer from 7 parts to 17 parts. The results of testing are shown in Table 1.

COMPARATIVE EXAMPLE 7

The formulation of the PVC-based resin composition and the testing procedures thereof other than the yellowing test were substantially the same as in Example 2 excepting omission of the EVA-I resin. The results of testing are shown in Table 1.

COMPARATIVE EXAMPLE 8

The formulation of the PVC-based resin composition and the testing procedures thereof other than the yellowing test were substantially the same as in Example 2 excepting increase in the amount of the EVA-I resin from 3 parts to 10 parts. The results of testing are shown in Table 1.

COMPARATIVE EXAMPLE 9

The formulation of the PVC-based resin composition and the testing procedures thereof other than the yellowing test were substantially the same as in Example 2 excepting decrease in the amount of the AS resin from 7 parts to 2 parts. The results of testing are shown in Table 1.

COMPARATIVE EXAMPLE 10

The formulation of the PVC-based resin composition and the testing procedures thereof other than the yellowing test were substantially the same as in Example 2 excepting increase in the amount of the AS resin from 7 parts to 13 parts. The results of testing are shown in Table 1.

COMPARATIVE EXAMPLE 11

The formulation of the PVC-based resin composition was substantially the same as in Example 2 excepting replacement of the acrylic rubber-based graft copolymer with the same amount of a graft copolymer-type ABS resin containing 65% by weight of the butadiene moiety (G-4, a product by Ube Saicon Co.). The resin composition was subjected to the test of yellowing in the same manner as in Example 2 to give the results shown in Table 2.

COMPARATIVE EXAMPLE 12

The formulation of the PVC-based resin composition was substantially the same as in Example 2 excepting replacement of the EVA-I resin with the same amount of a styrene-butadiene copolymeric rubber of which the weight proportion of the styrene moiety to the butadiene moiety was 40:60 (TRKX-1398, a product by Shell Chemical Co.). The resin composition was subjected to the test of yellowing in the same manner as in Example 2 to give the results shown in Table 2.

COMPARATIVE EXAMPLE 13

The formulation of the PVC-based resin composition was substantially the same as in Example 2 excepting replacement of the acrylic rubber-based graft copolymer with the same amount of the same ABS resin as used in Comparative Example 11 and replacement of the EVA-I resin with the same amount of the same styrene-butadiene copolymeric rubber as used in Comparative Example 12. The resin composition was subjected to the test of yellowing in the same manner as in Example 2 to give the results shown in Table 2.

TABLE 1

| | Flowability × $10^{-3}$ ml/s | Smoothness | Impact strength, kg·cm/$cm^2$ | Heat resistance, °C. | Tensile tests yield value kgf/$cm^2$ | tensile strength, kgf/$cm^2$ | elongation, % |
|---|---|---|---|---|---|---|---|
| Example | | | | | | | |
| 1 | 14.0 | 4 | 87 | 92 | 480 | 493 | 172 |
| 2 | 12.0 | 5 | 115 | 92 | 489 | 482 | 175 |
| 3 | 11.0 | 5 | 137 | 92 | 497 | 493 | 172 |
| Comparative Example | | | | | | | |
| 1 | 2.5 | 3 | 142 | 94 | 472 | 488 | 154 |
| 2 | 15.0 | 4 | 60 | 89 | 464 | 472 | 151 |
| 3 | 12.5 | 4 | 95 | 90 | 462 | 458 | 157 |
| 4 | 9.2 | 5 | 100 | 85 | 475 | 483 | 122 |
| 5 | 13.7 | 2 | 17 | 92 | 507 | 514 | 124 |
| 6 | 4.3 | 5 | 148 | 85 | 443 | 438 | 158 |
| 7 | 2.7 | 2 | 62 | 91 | 493 | 495 | 162 |
| 8 | 7.8 | 5 | 132 | 85 | 431 | 426 | 127 |
| 9 | 3.5 | 3 | 126 | 88 | 412 | 418 | 126 |
| 10 | 6.8 | 5 | 27 | 93 | 493 | 495 | 162 |

TABLE 2

| | Yellowness, ΔE, after accelerated aging for | | | | |
|---|---|---|---|---|---|
| | (initial) | 100 hours | 300 hours | 500 hours | 1000 hours |
| Example 2 | 1.9 | 1.9 | 2.0 | 2.0 | 2.1 |
| Comparative Example 11 | 2.0 | 2.3 | 3.6 | 7.0 | 14.6 |
| Comparative Example 12 | 2.0 | 2.4 | 3.2 | 6.0 | 14.3 |
| Comparative Example 13 | 2.0 | 2.8 | 4.7 | 8.9 | 16.2 |

What is claimed is:

1. A polyvinyl chloride-based resin composition which comprises, as a uniform blend:
   (a) 100 parts by weight of a polyvinyl chloride resin having an average degree of polymerization in the range from 700 to 2500;
   (b) from 4 to 15 parts by weight of an acrylic rubber-based graft copolymer;
   (c) from 0.5 to 8 parts by weight of a copolymeric resin of ethylene and vinyl acetate, of which the weight ratio of the ethylene moiety to the vinyl acetate moiety is in the range from 40:60 to 70:30; and
   (d) from 1 to 10 parts by weight of a copolymeric resin of acrylonitrile and styrene, of which the weight ratio of the acrylonitrile moiety to the styrene moiety is in the range from 10:90 to 35:65.

2. The polyvinyl chloride-based resin composition as claimed in claim 1 in which the acrylic rubber-based graft copolymer as the component (b) consists of from 50 to 80% by weight of the acrylic rubber as a base polymer and from 50 to 20% by weight of a grafting moiety formed by the graft copolymerization of a monomeric compound selected from the group consisting of alkyl esters of acrylic or methacrylic acid of which the alkyl group has 2 to 8 carbon atoms, aromatic vinyl compounds and unsaturated nitrile compounds.

3. The polyvinyl chloride-based resin composition as claimed in claim 1 in which the polyvinyl chloride resin as the component (a) has an average degree of polymerization in the range from 1000 to 1700.

4. The polyvinyl chloride-based resin composition as claimed in claim 1 in which the polyvinyl chloride resin as the component (a) is a homopolymer of vinyl chloride.

5. The polyvinyl chloride-based resin composition as claimed in claim 1 in which the amount of the component (b) is in the range from 5 to 13 parts by weight per 100 parts by weight of the component (a).

6. The polyvinyl chloride-based resin composition as claimed in claim 1 in which the amount of the component (c) is in the range from 1 to 7 parts by weight per 100 parts by weight of the component (a).

7. The polyvinyl chloride-based resin composition as claimed in claim 1 in which the weight ratio of the acrylonitrile moiety to the styrene moiety in the copolymeric resin of acrylonitrile and styrene as the component (d) is in the range from 28:80 to 25:75.

8. The polyvinyl chloride-based resin composition as claimed in claim 1 in which the amount of the component (d) is in the range from 3 to 10 parts by weight per 100 parts by weight of the component (a).

9. The polyvinyl chloride-based resin composition of claim 1, wherein each of the components (b), (c) and (d) has no unsaturated linkage in the main chain of their molecular structure.

10. The polyvinyl chloride-based resin composition of claim 1, wherein component (a) is a copolymer of vinyl chloride copolymerized with other comonomers copolymerizable therewith provided that the weight fraction of the vinyl chloride moiety is at least 50%.

11. The polyvinyl chloride-based resin composition of claim 2, wherein the acrylic rubber is a polymer of an alkyl ester of acrylic acid where the alkyl group has 1 to 13 carbon atoms or a copolymer of this acrylic monomer with an unsaturated nitrile monomer; and the monomeric compound for the grafting moiety is selected from the group consisting of ethyl acrylate, propyl acrylate, 2-ethylhexyl acrylate, ethyl methacrylate, propyl methacrylate, 2-ethylhexyl methacrylate, styrene, α-methylstyrene, vinyl toluene, d-methyl vinyl toluene, acrylonitrile, methacrylonitrile and mixtures thereof.

* * * * *